(12) United States Patent
Yamada et al.

(10) Patent No.: US 10,982,758 B2
(45) Date of Patent: Apr. 20, 2021

(54) CONTROL DEVICE OF VEHICLE

(71) Applicant: TOYOTA JIDOSHA KABUSHIKI KAISHA, Toyota (JP)

(72) Inventors: Kazuhiko Yamada, Okazaki (JP); Akihiro Sato, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 105 days.

(21) Appl. No.: 16/413,713

(22) Filed: May 16, 2019

(65) Prior Publication Data
US 2019/0353243 A1 Nov. 21, 2019

(30) Foreign Application Priority Data

May 16, 2018 (JP) .............................. JP2018-094966

(51) Int. Cl.
| | | |
|---|---|---|
| *F16H 61/14* | (2006.01) | |
| *B60W 10/02* | (2006.01) | |
| *F16H 61/00* | (2006.01) | |
| *B60W 30/16* | (2020.01) | |

(52) U.S. Cl.
CPC ......... *F16H 61/143* (2013.01); *B60W 10/026* (2013.01); *B60W 30/16* (2013.01); *B60W 2710/0666* (2013.01); *F16H 2061/0012* (2013.01); *F16H 2061/0015* (2013.01)

(58) Field of Classification Search
None
See application file for complete search history.

(56) References Cited

U.S. PATENT DOCUMENTS

| | | | |
|---|---|---|---|
| 4,506,752 A | | 3/1985 | Hara et al. |
| 6,067,495 A | * | 5/2000 | Fliearman ........... F16H 61/0213 477/108 |
| 6,070,118 A | * | 5/2000 | Ohta ...................... G01C 21/26 701/65 |
| 6,125,321 A | * | 9/2000 | Tabata ............... B60K 31/0008 180/170 |
| 6,236,929 B1 | * | 5/2001 | Sen ...................... B60K 31/047 701/93 |
| 6,345,223 B1 | * | 2/2002 | Takizawa .............. B60T 8/3215 477/166 |
| 2007/0213175 A1 | * | 9/2007 | Kuwahara ............. F16H 61/143 477/62 |

FOREIGN PATENT DOCUMENTS

| | | |
|---|---|---|
| JP | S58-61357 A | 4/1983 |
| JP | S58-072763 A | 4/1983 |

* cited by examiner

*Primary Examiner* — Timothy Hannon
(74) *Attorney, Agent, or Firm* — Oliff PLC

(57) ABSTRACT

A control device of a vehicle disposed on a vehicle including an engine and a fluid transmission device including a lockup clutch, the control device of a vehicle comprises: an automated-driving running control portion automatically controlling at least an engine torque so that the vehicle runs in a predefined target running state without requiring an acceleration/deceleration operation; and a lockup control portion engaging/releasing the lockup clutch in accordance with a predefined lockup condition. The automated-driving running control portion includes a fuel efficiency priority running portion setting the target running state such that the lockup clutch is brought into an engaged state in accordance with the lockup condition.

12 Claims, 9 Drawing Sheets

FIG.2

|  | C1 | C2 | B1 | B2 | B3 | F1 |
|---|---|---|---|---|---|---|
| 1st | ○ |  |  | ◎ |  | △ |
| 2nd | ○ |  | ○ |  |  |  |
| 3rd | ○ |  |  |  | ○ |  |
| 4th | ○ | ○ |  |  |  |  |
| 5th |  | ○ |  |  | ○ |  |
| 6th |  | ○ | ○ |  |  |  |
| R |  |  |  | ○ | ○ |  |
| N |  |  |  |  |  |  |

◎ ENGAGED ONLY DURING ENGINE BRAKING
△ ENGAGED ONLY DURING DRIVING

CONTROL DEVICE OF VEHICLE

This application claims priority from Japanese Patent Application No. 2018-094966 filed on May 16, 2018, the disclosure of which is herein incorporated by reference in its entirety.

FIELD OF THE INVENTION

The present invention relates to a control device of a vehicle and, more particularly, to a technique of improving a fuel efficiency performance of the fuel through engagement of a lockup clutch.

DESCRIPTION OF THE RELATED ART

Vehicles having an engine and a fluid transmission device including a lockup clutch are widely used. A vehicle described in Patent Document 1 is an example thereof and an operational region for engaging the lockup clutch is expanded during automatic constant speed running in which a running speed is maintained constant without requiring a driver's acceleration/deceleration operation, thereby increasing a frequency of running in a lockup state of the clutch to improve a fuel efficiency performance.

PRIOR ART DOCUMENT

Patent Document

Patent Document 1: Japanese Laid-Open Patent Publication No. 58-61357

SUMMARY OF THE INVENTION

Technical Problem

However, expanding the operational region for engaging the lockup clutch as described above may deteriorate NV (Noise, Vibration) performance due to rotation vibration etc. of the engine.

The present invention was conceived in view of the situations and it is therefore an object of the present invention to increase a frequency of running with a lockup clutch engaged so as to improve a fuel efficiency performance while suppressing a deterioration in NV performance.

Solution to Problem

To achieve the above object, a first aspect of the present invention provides a control device of a vehicle (a) disposed on a vehicle including an engine and a fluid transmission device including a lockup clutch, the control device of a vehicle comprising: (b-1) an automated-driving running control portion automatically controlling at least an engine torque so that the vehicle runs in a predefined target running state without requiring an acceleration/deceleration operation; and (b-2) a lockup control portion engaging/releasing the lockup clutch in accordance with a predefined lockup condition, wherein (c) the automated-driving running control portion includes a fuel efficiency priority running portion setting the target running state such that the lockup clutch is brought into an engaged state in accordance with the lockup condition.

A second aspect of the present invention provides the control device of a vehicle recited in the first aspect of the invention, wherein (a) the lockup condition is defined based on at least a parameter related to the engine torque, and wherein (b) the fuel efficiency priority running portion calculates a required drive power with which the vehicle runs in the target running state and performs running with the engine torque at which the lockup clutch is engaged when the lockup clutch is engaged in accordance with the lockup condition within a range of the engine torque in which an allowable drive power defined to include the required drive power is acquired.

A third aspect of the present invention provides the control device of a vehicle recited in the first or second aspect of the invention, wherein (a) the control device includes an operated running control portion controlling the engine torque in accordance with a driver's acceleration/deceleration operation, wherein (b) the lockup condition is defined based on a parameter related to the engine torque and an engine rotation speed, wherein (c) the lockup condition is different between during running according to the operated running control portion and during running according to the fuel efficiency priority running portion, and wherein the lockup condition during running according to the fuel efficiency priority running portion has a lockup region for engaging the lockup clutch expanded to a region of the higher engine torque in a certain engine rotation speed region as compared to the lockup condition during running according to the operated running control portion.

A fourth aspect of the present invention provides the control device of a vehicle recited in any one of the first to third aspects of the invention, wherein the fuel efficiency priority running portion sets the target running state so that the engaged state of the lockup clutch is maintained in accordance with the lockup condition at the time of accelerating based on the target running state.

A fifth aspect of the present invention provides the control device of a vehicle recited in the first aspect of the invention, wherein (a) the lockup condition is defined to include a parameter related to the engine torque, and wherein (b) the fuel efficiency priority running portion calculates a required drive power with which the vehicle runs in the target running state, prepares a plurality of different candidates of the engine torque within a range in which an allowable drive power defined to include the required drive power is acquired, and selects from the plurality of candidates the candidate with a best fuel efficiency performance in consideration of an engagement/release state of the lockup clutch engaged/released in accordance with the engine torque.

A sixth aspect of the present invention provides the control device of a vehicle recited in the fifth aspect of the invention, wherein (a) the vehicle includes an automatic transmission establishing a plurality of forward gear positions different in gear ratio, and wherein (b) the fuel efficiency priority running portion sets a plurality of different candidates of the engine torque in consideration with the different forward gear positions within a range in which the allowable drive power is acquired, and selects from the plurality of candidates the candidate with a best fuel efficiency performance.

A seventh aspect of the present invention provides the control device of a vehicle recited in the sixth aspect of the invention, wherein the automated-driving control portion includes an NV priority running portion calculating a required drive power with which the vehicle runs in the target running state and preparing a plurality of different candidates of the engine torque in consideration with the different forward gear positions within a range in which an allowable drive power defined to include the required drive power is acquired, and selects from the plurality of candidates the candidate most excellent in NV performance in terms of noise and vibration.

An eighth aspect of the present invention provides the control device of a vehicle recited in the sixth or seventh aspect of the invention, wherein the automated-driving control portion includes a drive power priority running portion calculating a required drive power with which the vehicle runs in the target running state and preparing a plurality of different candidates of the forward gear position and the engine torque such that a surplus drive power larger than the required drive power is acquired, and selects from the plurality of candidates the candidate of the forward gear position on the low speed side having the largest speed change ratio.

Advantageous Effects of Invention

The control device of a vehicle as described above includes the fuel efficiency priority running portion setting the target running state such that the lockup clutch is brought into the engaged state in accordance with the lockup condition, and therefore, the fuel efficiency performance can be improved by engaging the lockup clutch without impairing the NV performance as in the case of expanding the lockup region.

According to the second aspect of the invention, the lockup condition is defined based on at least the parameter related to the engine torque, the control device calculates the required drive power with which the vehicle runs in the target running state and performs running with the engine torque at which the lockup clutch is engaged when the lockup clutch is engaged in accordance with the lockup condition within the range of the engine torque in which the drive power within a predetermined allowable range is acquired with respect to the required drive power. This increases a frequency of running with the lockup clutch engaged and improves the fuel efficiency performance.

The control device recited in the third aspect of the invention includes the operated running control portion controlling the engine torque in accordance with the driver's acceleration/deceleration operation, the lockup condition which is defined based on a parameter related to the engine torque and an engine rotation speed is different between during running according to the operated running control portion and during running according to the fuel efficiency priority running portion, and the lockup condition during running according to the fuel efficiency priority running portion has the lockup region of the clutch expanded to the region of the higher engine torque as compared to running according to the operated running control portion in a certain engine rotation speed region. Specifically, if the lockup condition having the lockup region expanded in the certain engine rotation speed region is used during running according to the operated running control portion, and the engine rotation speed increases while the engine torque is substantially constant during acceleration etc., a busy shift occurs i.e. the lockup clutch is engaged and released in a short time when the engine rotation speed passes through the certain engine rotation speed region, which may cause the driver to have a discomfort feeling, and therefore, such a lockup in the certain engine rotation speed region is prohibited. On the other hand, during running according to the fuel efficiency priority running portion setting the target running state for running such that the lockup clutch is brought into the engaged state, the engine torque is controlled to satisfy the lockup condition, so that the busy shift of the lockup clutch is suppressed, and the fuel efficiency performance can further be improved by the expansion of the lockup region.

The control device recited in the fourth aspect of the invention sets the target running state so that the engaged state of the lockup clutch is maintained in accordance with the lockup condition at the time of accelerating based on the target running state. This increases a frequency of accelerated running with the lockup clutch engaged, so that the fuel efficiency performance is improved.

According to the fifth aspect of the invention, the lockup condition is defined to include the parameter related to the engine torque, the control device calculates the required drive power with which the vehicle runs in the target running state, and the plurality of different candidate operation points of the engine torque is prepared within a range in which the allowable drive power defined to include the required drive power is acquired, and selects from the plurality of candidates one with the best fuel efficiency performance in consideration of the engagement/release state of the lockup clutch, and this consequently increases a frequency of running with the lockup clutch engaged, so that the fuel efficiency performance is improved.

According to the sixth aspect of the invention, the vehicle includes the automatic transmission establishing any one of the plurality of forward gear positions, and the plurality of different candidate operation points of the engine torque is set, in consideration with the different forward gear positions, within a range in which the allowable drive power is acquired, and selects from the plurality of candidates the candidate with the best fuel efficiency performance, and this further increases a frequency of running with the lockup clutch engaged while the forward gear position is changed, so that the fuel efficiency performance can further be improved.

The control device recited in the seventh aspect of the invention includes the NV priority running portion calculating the required drive power with which the vehicle runs in the target running state, and the plurality of different candidate operation points of the engine torque is prepared, in consideration with the different forward gear positions, within a range in which the allowable drive power defined to include the required drive power is acquired, and selects from the plurality of candidates the candidate most excellent in NV performance in terms of noise and vibration, so that the excellent fuel efficiency performance can be acquired.

The control device recited in the eighth aspect of the invention includes the drive power priority running portion calculating the required drive power with which the vehicle runs in the target running state, and the plurality of different candidate operation points of the forward gear positions and the engine torque is prepared such that the surplus drive power larger than the required drive power is acquired, and selects from the plurality of candidates the operation point of the forward gear position on the low speed side having the largest speed change ratio, and this makes a degree of surplus of the drive power higher, so that the automated-driving running can be performed with a surplus drive power while suppressing the busy shift of the forward gear position on an uphill road, a winding road, etc.

BRIEF DESCRIPTION OF DRAWINGS

FIG. 2 is an operation table for explaining a plurality of gear positions of an automatic transmission of FIG. 1 and operation states of friction engagement devices for establishing the gear positions.

MODES FOR CARRYING OUT THE INVENTION

Figure 1:
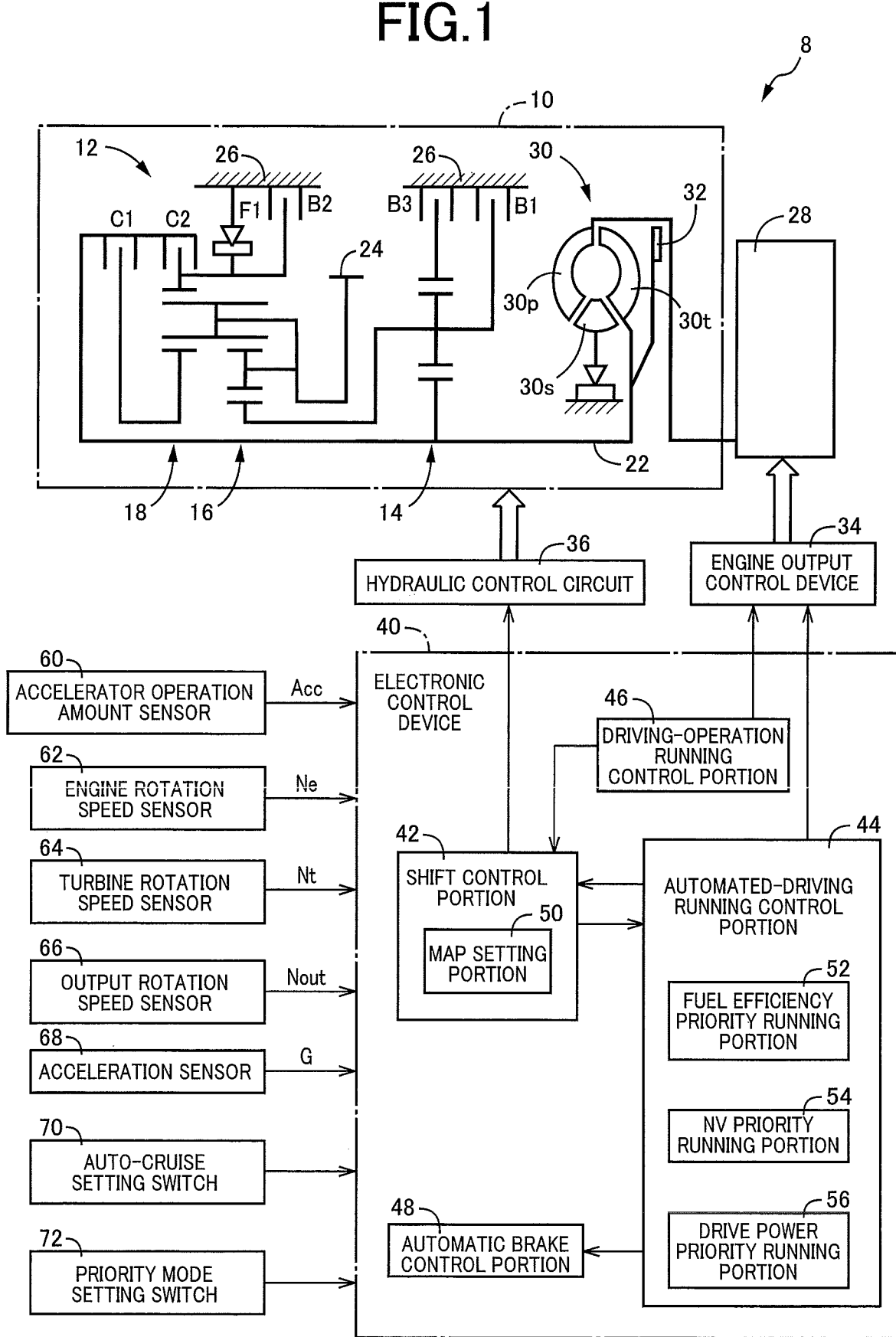
FIG. 1 is a schematic configuration diagram of a power transmission device of a vehicle having a control device to which the present invention is applied, also showing main portions of a control system.

The present invention is preferably applied to an engine drive vehicle including as a drive power source an engine such as an internal combustion engine generating a power from combustion of fuel and may be applied to a hybrid vehicle etc. including an electric motor as a drive power source in addition to the engine. A torque converter is preferably used as the fluid transmission device; however, a fluid coupling etc. is also employable. The lockup control portion engaging/releasing the lockup clutch is configured to engage/release the lockup clutch in accordance with the predefined lockup condition (such as a lockup switching map) including the parameter related to the engine torque such that the lockup clutch is engaged on the side of the lower engine torque (i.e., when the engine torque is relatively low), for example. The parameter related to the engine torque may be an engine torque or may be a throttle valve opening degree of an electronic throttle valve etc. When the lockup clutch is engaged, a fuel efficiency performance is improved; however, engine rotation vibration etc. are directly transmitted to a power transmission path including a transmission etc. and may deteriorate NV performance due to booming noise, gear noise, etc., so that the lock up condition is determined in consideration of a balance between the fuel efficiency performance and the NV performance, for example.

The automatic transmission is disposed downstream of the fluid transmission device, i.e., between the fluid transmission device and wheels, as necessary. The automatic transmission is preferably a multi-speed automatic transmission of a planetary gear type or a two-shaft meshing type having a plurality of forward gear positions established in accordance with an engagement/release state of a plurality of frictional engagement devices or can be a continuously variable transmission of a belt type etc. A speed change ratio of the continuously variable transmission can be changed in stages to use the continuously variable transmission as with the multi-speed transmission. A shift control portion switching the forward gear positions of the automatic transmission is configured to switch the forward gear position in accordance with a predefined shift condition (such as a shift map) including a parameter related to a drive power such that a forward gear position on the higher speed side having a smaller speed change ratio is selected when the drive power is lower, for example.

The target running state at the time of the automated-driving running according to the automated-driving running control portion is, for example, a target vehicle speed, a target acceleration, a target inter-vehicle distance, a target braking force, etc. The automated-driving running control portion provides, for example, a constant speed running control in which a required drive power is calculated for running at the target vehicle speed set by the driver so that the vehicle performs constant speed running at a substantially constant vehicle speed, an acceleration control in which a required drive power is calculated for accelerating the vehicle at a predefined target acceleration at the start of the vehicle from a stop state thereof etc. so that the vehicle is accelerated with the target acceleration, a follow-up running control in which a required drive power is calculated based on an inter-vehicle distance to a preceding vehicle so that the vehicle performs follow-up running at a predefined target inter-vehicle distance, etc., and may provide at least one automated-driving control in which at least the engine torque is automatically controlled for running. The required drive power can be calculated by using feedback control or feedforward control, for example. The automated-driving running control portion controls the engine torque or shifts the forward gear position of the automatic transmission so that the required drive power can be acquired, for example. The automated-driving running control portion is configured to automatically control at least the engine torque; however, the automated-driving running control portion can also automatically control a braking force of an automatic braking system or automatically control a steering angle etc. of an automatic steering system in addition to the engine torque. The automated-driving running control portion may perform not only manned automated driving but also unmanned automated driving. A deterioration in NV performance is not preferable for occupants such as the driver as well as the vehicle.

The fuel efficiency priority running portion sets the target running state such that the lockup clutch is brought into the engaged state in accordance with the lockup condition and is configured to provide a predetermined margin to the target running state itself such as the target vehicle speed and the target acceleration, for example; however, the fuel efficiency priority running portion may provide a margin to the required drive power, the engine torque, etc. calculated in accordance with the target vehicle speed, the target acceleration, etc. Providing a margin to the required drive power or the engine torque has substantially the same meaning as providing a margin to the target running state. Regarding how to provide the margin, for example, a range of an allowable drive power can be defined by adding/subtracting a certain percentage of the required drive power to/from the required drive power; however, the range of the allowable drive power can also be defined by adding/subtracting a predefined constant value to/from the required drive power. The margin may be provided only on the addition side or the subtraction side, and various other forms are available.

If the operated running control portion controlling the engine torque in accordance with the driver's acceleration/deceleration operation is included, the lockup condition during running according to the fuel efficiency priority running portion can be defined to differ from the lockup condition during running according to the operated running control portion such that the lockup clutch is engaged even in a region of the higher engine torque in the certain engine rotation speed region as compared to the lockup condition during running according to the operated running control portion, for example; however, a common lockup condition may be used for providing an engagement/release control of the lockup clutch. If the automated-driving running control portion has, for example, the NV priority running portion and the drive power priority running portion in addition to the fuel efficiency priority running portion, a different lockup condition can be defined for each of the running portions, or a different lockup condition can be defined for some of the running portions; however, the common lockup condition may be used in all the running portions. The automated-driving running control portion desirably has the NV priority running portion and the drive power priority running portion or another running portion in addition to the fuel efficiency priority running portion; however, the automated-driving running control portion may include at least the fuel efficiency priority running portion.

Example

An example of the present invention will now be described in detail with reference to the drawings.

FIG. 1 is a schematic configuration diagram for explaining a power transmission device 10 of a vehicle 8 that is an example of the present invention, also showing main portions of a control system, and in which an automatic transmission 12 is included. The automatic transmission 12 is preferably used for an FF (front-engine front-drive) vehicle in which the automatic transmission 12 is mounted in a left-right direction of the vehicle 8 (transversely), includes a single pinion type first planetary gear device 14, a double pinion type second planetary gear device 16, and a single pinion type third planetary gear device 18 on the same axis, and changes a speed of rotation of an input shaft 22 to output from an output gear 24. The input shaft 22 corresponds to an input member of the automatic transmission 12 and is a turbine shaft of a torque converter 30 rotationally driven by an engine 28. The output gear 24 corresponds to an output member of the automatic transmission 12 and outputs a drive power to left and right drive wheels through a differential gear device not shown. The automatic transmission 12 and the torque converter 30 are configured substantially symmetrically with respect to a center line and have lower halves from the center line thereof not shown in FIG. 1.

The engine 28 is a drive power source and is, for example, an internal combustion engine such as a gasoline engine generating power from combustion of fuel. Therefore, the vehicle 8 of this example is an engine drive vehicle having only the engine 28 as the drive power source. An output of the engine 28 is controlled by an engine output control device 34. The engine output control device 34 includes, for example, an electronic throttle valve, a fuel injection device, and an ignition device, and the electronic throttle valve, the fuel injection device, the ignition device, etc. are each controlled in accordance with a control signal supplied from an electronic control device 40, so that the engine output is electrically controlled.

The torque converter 30 includes a pump impeller 30$p$ coupled to a crankshaft of the engine 28, a turbine impeller 30$t$ coupled to the input shaft 22 of the automatic transmission 12, and a stator impeller 30$s$ coupled to a housing (transmission casing) 26 via a one-way clutch and is a fluid transmission device transmitting the power generated by the engine 28 through a fluid to the automatic transmission 12. A lockup clutch 32 is a direct coupling clutch provided between the pump impeller 30$p$ and the turbine impeller 30$t$ and is switched between an engaged state and a released state by a lockup control valve etc. of a hydraulic control circuit 36 electrically controlled in accordance with a lockup control signal supplied from the electronic control device 40. The lockup clutch 32 is integrally engaged in a relatively non-rotatable manner in the engaged state, so that the pump impeller 30$p$ and the turbine impeller 30$t$ are integrally rotated. In other words, the crankshaft of the engine 28 is directly coupled to the input shaft 22.

The automatic transmission 12 is a multi-speed transmission having clutches C1, C2, brakes B1, B2, B3 (hereinafter simply referred to as clutches C, brakes B if not particularly distinguished) as a plurality of friction engagement devices and establishing any one of a plurality of gear positions by selectively engaging the plurality of friction engagement devices. The clutches C and the brakes B are hydraulic frictional engagement devices engaged and released by a hydraulic actuator such as a multi-plate clutch or brake and are subjected to an engagement/release control by an AT solenoid valve etc. of the hydraulic control circuit 36 electrically controlled in accordance with a shift control signal supplied from the electronic control device 40. FIG. 2 summarizes a relationship between the gear positions of the automatic transmission 12 and operating states of the clutches C and the brakes B, and a "circle", a "double circle", and a blank indicate engagement, engagement only during engine braking, and release, respectively. In this example, six gear positions from a first speed gear position "1st" to a sixth speed gear position "6th" are established as forward gear positions of the automatic transmission 12, and a speed change ratio γ (=rotation speed of the input shaft 22/rotation speed Nout of the output gear 24) is reduced in stages in order from the first speed gear position "1st" to the sixth speed gear position "6th". "F1" of FIGS. 1 and 2 is a one-way clutch brought into an engaged state when the first speed gear position "1st" is established and is engaged only at the time of driving of the vehicle 8 and brought into an idling state while the vehicle 8 is driven. "R" of FIG. 2 is a reverse gear position of the automatic transmission 12, and "N" is a neutral state of the automatic transmission 12 in which power transmission is interrupted.

Returning to FIG. 1, the vehicle 8 includes the electronic control device 40 as a controller for providing the output control of the engine 28, the shift control of the automatic transmission 12, and the engagement/release control of the lockup clutch 32. Therefore, the electronic control device 40 functions as a control device of the vehicle 8. An accelerator operation amount sensor 60, an engine rotation speed sensor 62, a turbine rotation speed sensor 64, an output rotation speed sensor 66, an acceleration sensor 68, etc. are connected to the electronic control device 40 and respectively supply signals indicative of an accelerator-pedal depressing operation amount (accelerator operation amount) Acc, an engine rotation speed Ne, a turbine rotation speed Nt, the rotation speed (output rotation speed) Nout of the output gear 24, a vehicle acceleration G, etc. The output rotation speed Nout corresponds to a vehicle speed V.

An auto-cruise setting switch 70 and a priority mode setting switch 72 are also connected to the electronic control device 40. The auto-cruise setting switch 70 is a device operated for selecting an auto-cruise running mode in which constant speed running or follow-up running is performed without requiring a driver's acceleration/deceleration operation and used for setting a target vehicle speed Vtag, increasing/decreasing the target vehicle speed Vtag, and setting a target inter-vehicle distance Dtag during the follow-up running, and is disposed on a steering wheel, for example, and signals indicative of the target vehicle speed Vtag, the target inter-vehicle distance Dtag, etc. are supplied to the electronic control device 40. The priority mode setting switch 72 is used for selecting one of priority modes during running in the auto-cruise running mode and can be used in this example for selecting from three priority modes which are a fuel efficiency priority mode for giving priority to fuel efficiency performance, an NV priority mode for giving priority to NV performance, and a drive power priority mode for ensuring a surplus drive power.

The electronic control device 40 is configured to include a so-called microcomputer including a CPU, a RAM, a ROM, an I/O interface, etc. and the CPU executes signal processes in accordance with a program stored in advance in the ROM, while utilizing a temporary storage function of the RAM, and functionally includes a shift control portion 42, an automated-driving running control portion 44, an operated running control portion 46, and an automatic brake control portion 48.

Figure 7:
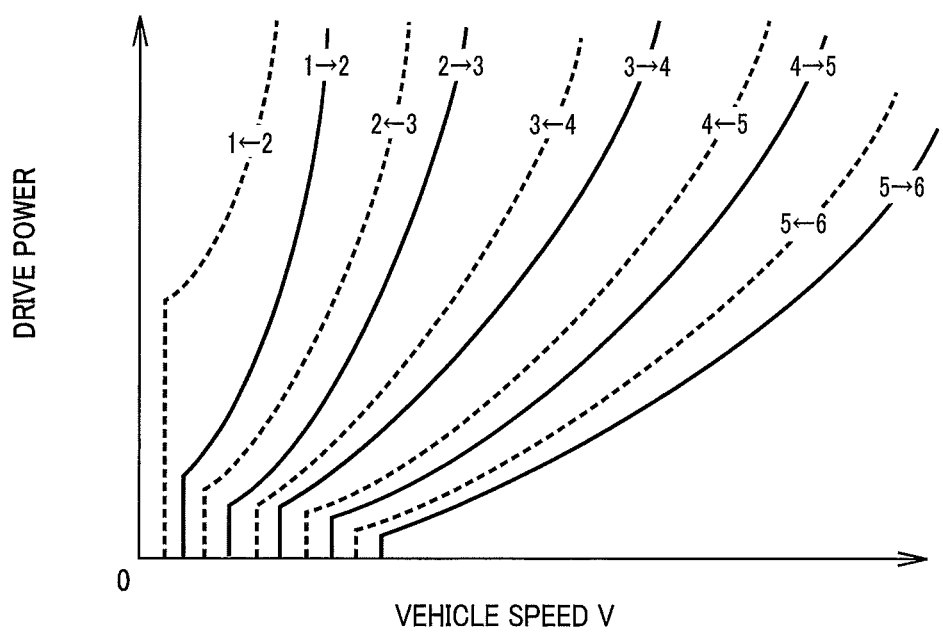
FIG. 7 is a diagram for explaining an example of a shift map of the automatic transmission of FIG. 1.

The shift control portion 42 provides the shift control of the automatic transmission 12 and the engagement/release control of the lockup clutch 32 and has a function of a lockup control portion. In the shift control of the automatic transmission 12, the clutches C and the brakes B are subjected to the engagement/release control through the AT solenoid valve etc. of the hydraulic control circuit 36 so as to establish a target gear position obtained in accordance with a predefined shift map. The shift map is a shift condition set based on the drive power and the vehicle speed V as shown in FIG. 7, for example, and is defined such that as the vehicle speed V becomes higher, the transmission 12 is switched to a forward gear position on the higher speed side having a smaller speed change ratio γ and that as the drive power becomes higher, the transmission 12 is switched to a forward gear position on the lower speed side having a larger speed change ratio γ. The drive power is obtained from a torque Te of the engine 28 and the speed change ratio γ of the automatic transmission 12, for example, or a required drive power Fa calculated by the automated-driving running control portion 44 may be used. In FIG. 7, "1" to "6" denote the first to sixth speed gear positions 1st to 6th. Solid lines and broken lines of FIG. 7 are upshift lines and downshift lines, respectively, and a predetermined hysteresis is disposed therebetween.

Figure 8:
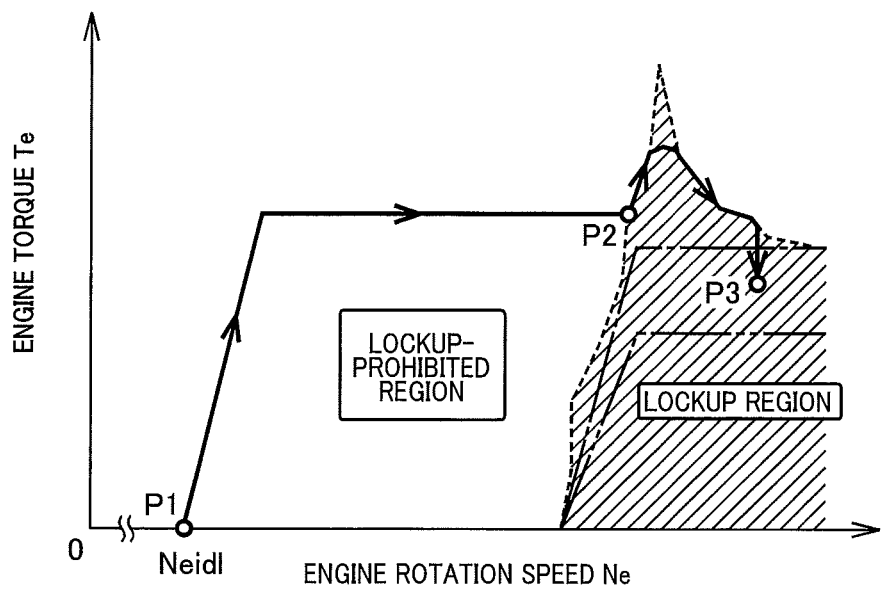
FIG. 8 is a diagram for explaining a plurality of lockup switching maps used in a lockup control by a shift control portion of FIG. 1, also showing an example of a change in engine operating point at the start of the vehicle according to a fuel efficiency priority running portion with arrows.

The engagement/release control of the lockup clutch 32 by the shift control portion 42 is provided in accordance with a predefined lockup condition. The lockup condition is indicated as a lockup switching map set in advance by using the engine torque Te and the engine rotation speed Ne as parameters as shown in FIG. 8, for example. Since the engagement of the lockup clutch 32 impairs the NV performance although improving the fuel efficiency performance, the lockup switching map is defined such that the fuel efficiency performance and the NV performance are balanced. In this example, the lockup switching map is defined separately for each of the priority modes during running in the auto-cruise running mode and is set by a map setting portion 50 depending on the priority mode. Specifically, a widest lockup region (hatched portion) below a broken line in FIG. 8 is used in the fuel efficiency priority mode, and the engine torque Te is projected upward (on the high torque side) into a spike shape or a chevron shape in a relatively narrow certain engine rotation speed region. The lockup region including the projected portion is a region with a relatively favorable NV performance and is defined in advance by experiments etc. based on vibration characteristics etc. of the engine 28 and the power transmission device 10. A lockup region having an intermediate size under a dashed-dotted line inside the hatched portion is used in the drive power priority mode, which is also used in the case of running in an operated miming mode in which the engine torque Te etc. are controlled in accordance with the driver's acceleration/deceleration operation, and the fuel efficiency performance and the NV performance are acquired in a balanced manner. A lockup region under a dashed-two dotted line inside the hatched portion is used in the NV priority mode and is defined as a narrowest region at the cost of the fuel efficiency performance so as to suppress deterioration in the NV performance due to the engagement of the lockup clutch 32. These lockup switching maps are separately defined for each of the multiple forward gear positions of the automatic transmission 12.

The automated-driving miming control portion 44 is a portion for performing the auto-cruise miming mode in this example, calculates a required drive power Fa for running at the target vehicle speed Vtag set by the auto-cruise setting switch 70, and controls the engine torque Te and changes one of the forward gear positions of the automatic transmission 12 to another so as to acquire the required drive power Fa. The required drive power Fa is obtained by feedforward control or feedback control, for example. Additionally, in the case of performing the follow-up running while keeping the target inter-vehicle distance Dtag with respect to a preceding vehicle, the automated-driving running control portion 44 calculates the required drive power Fa required for the follow-up running and controls the engine torque Te and the forward gear position in accordance with the required drive power Fa. The required drive power Fa may become negative (minus), for example, when the preceding vehicle decelerates, then, the required drive power Fa is achieved by causing engine braking to occur and, if necessary, in combination with a brake force of wheel brakes controlled by the automatic brake control portion 48. The automatic brake control portion 48 controls the brake force of the wheel brakes via an automatic braking system electrically controlling the brake force, i.e., brake hydraulic pressure, of the wheel brakes disposed on the wheels. At the start of the vehicle 8 after the vehicle 8 stops due to waiting for a traffic light etc., the automated-driving running control portion 44 calculates the required drive power Fa based on a target acceleration Gtag, the vehicle speed V, etc. such that the vehicle 8 is accelerated with the predefined target acceleration Gtag until reaching the target vehicle speed Vtag, or accelerated in accordance with a predefined acceleration pattern, and controls the engine torque Te and the forward gear position in accordance with the required drive power Fa. The electronic control device 40 of the vehicle 8 is connected to sensors detecting various pieces of information necessary for the auto-cruise running mode, such as a radar measuring a distance to the preceding vehicle and a camera detecting a state of a traffic light as needed, or is supplied with information of traffic lights etc. from the outside through inter-road communication etc. The auto-cruise running mode is an automated-driving running mode in which at least the engine torque Te is automatically controlled for running without requiring an acceleration/deceleration operation.

Figure 4:
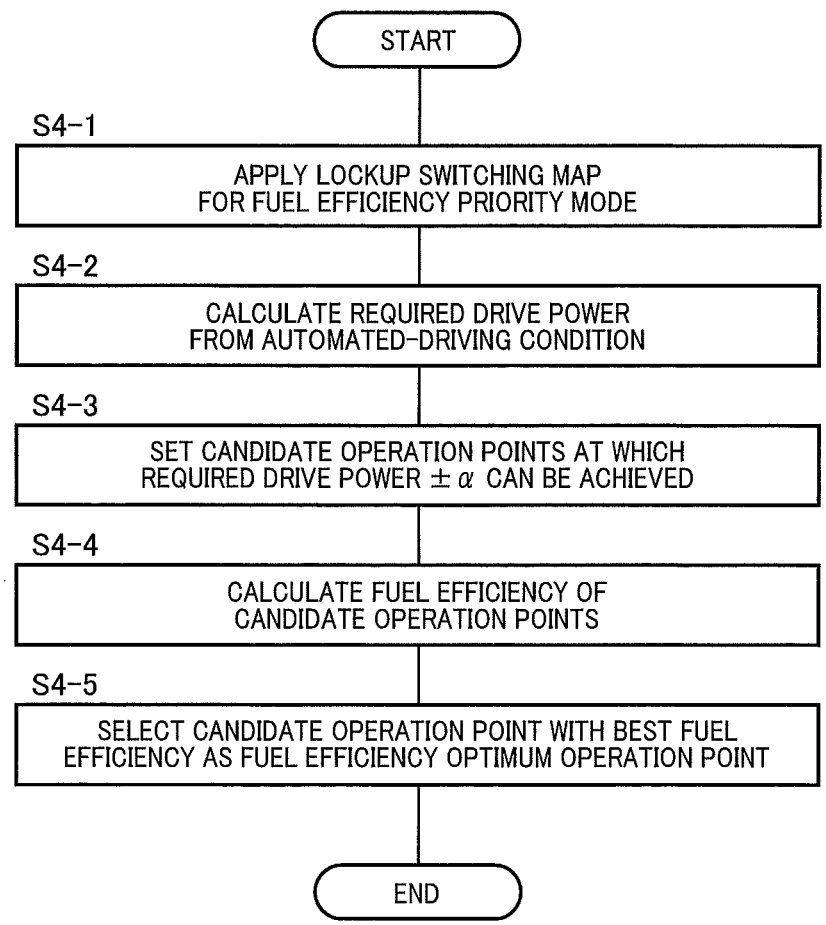
FIG. 4 is a flowchart for specifically explaining processing contents of step S4 of FIG. 3.
Figure 5:
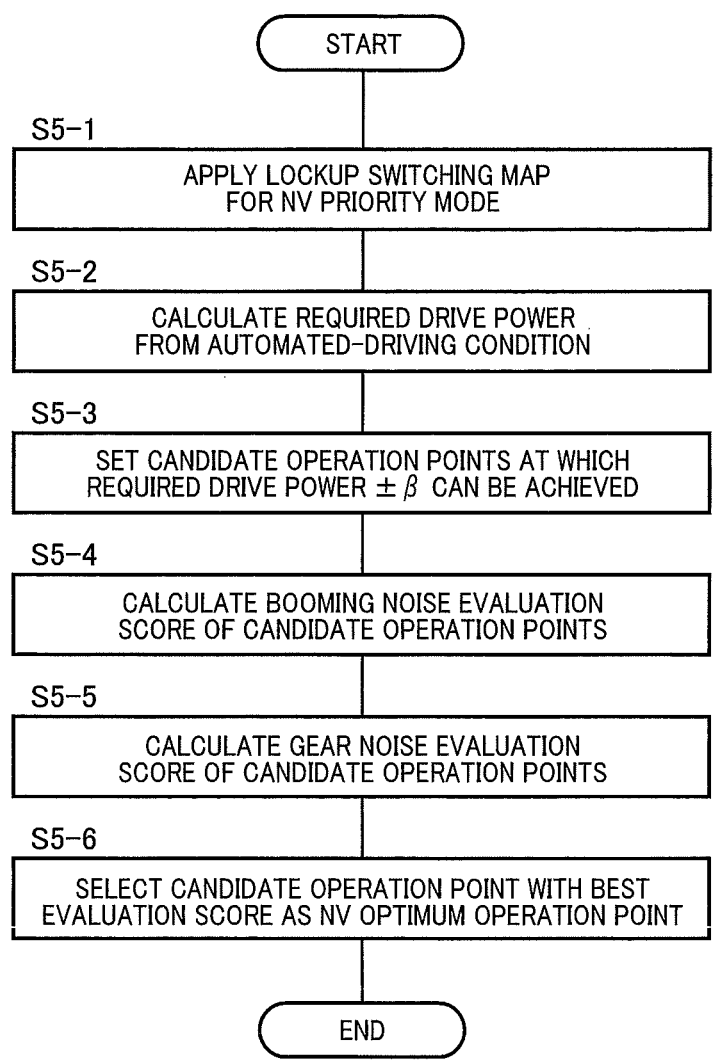
FIG. 5 is a flowchart for specifically explaining processing contents of step S5 of FIG. 3.
Figure 6:
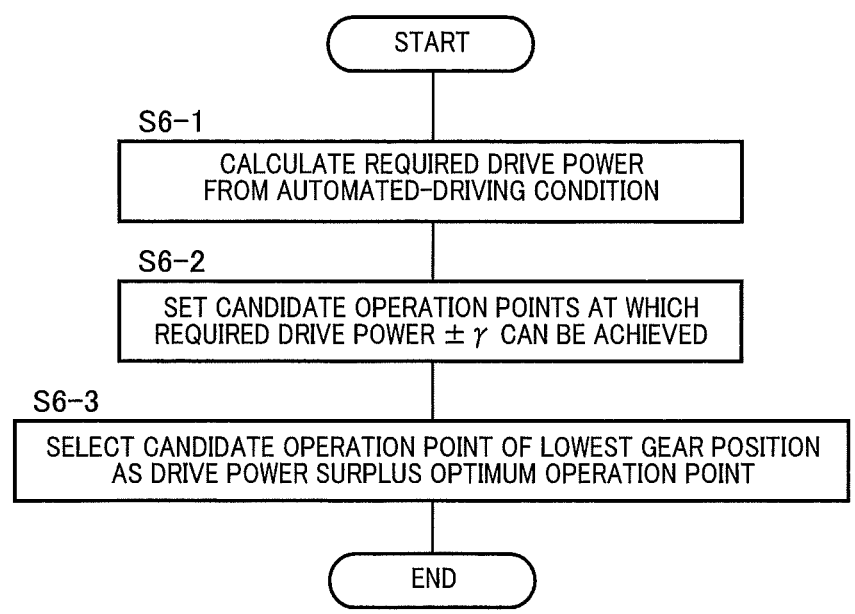
FIG. 6 is a flowchart for specifically explaining processing contents of step S6 of FIG. 3.

The automated-driving running control portion 44 also functionally includes a fuel efficiency priority running portion 52 performing the auto-cruise running in the fuel efficiency priority mode when the fuel efficiency priority mode is selected, an NV priority running portion 54 performing the auto-cruise running in the NV priority mode when the NV priority mode is selected, and a drive power priority running portion 56 performing the auto-cruise running in the drive power priority mode when the drive power priority mode is selected. Specifically, the automated-driving running control portion 44 executes signal processes for the auto-cruise running depending on the priority mode in accordance with steps S1 to S11 (hereinafter simply referred to as S1 to S11) of a flowchart of FIG. 3. S4 of FIG. 3 corresponds to the fuel efficiency priority running portion 52, and FIG. 4 is a flowchart for specifically explaining the signal process of S4. S5 of FIG. 3 corresponds to the NV priority running portion 54, and FIG. 5 is a flowchart for specifically explaining the signal process of S5. S6 of FIG. 3 corresponds to the drive power priority running portion 56, and FIG. 6 is a flowchart for specifically explaining the signal process of S6.

Figure 3:
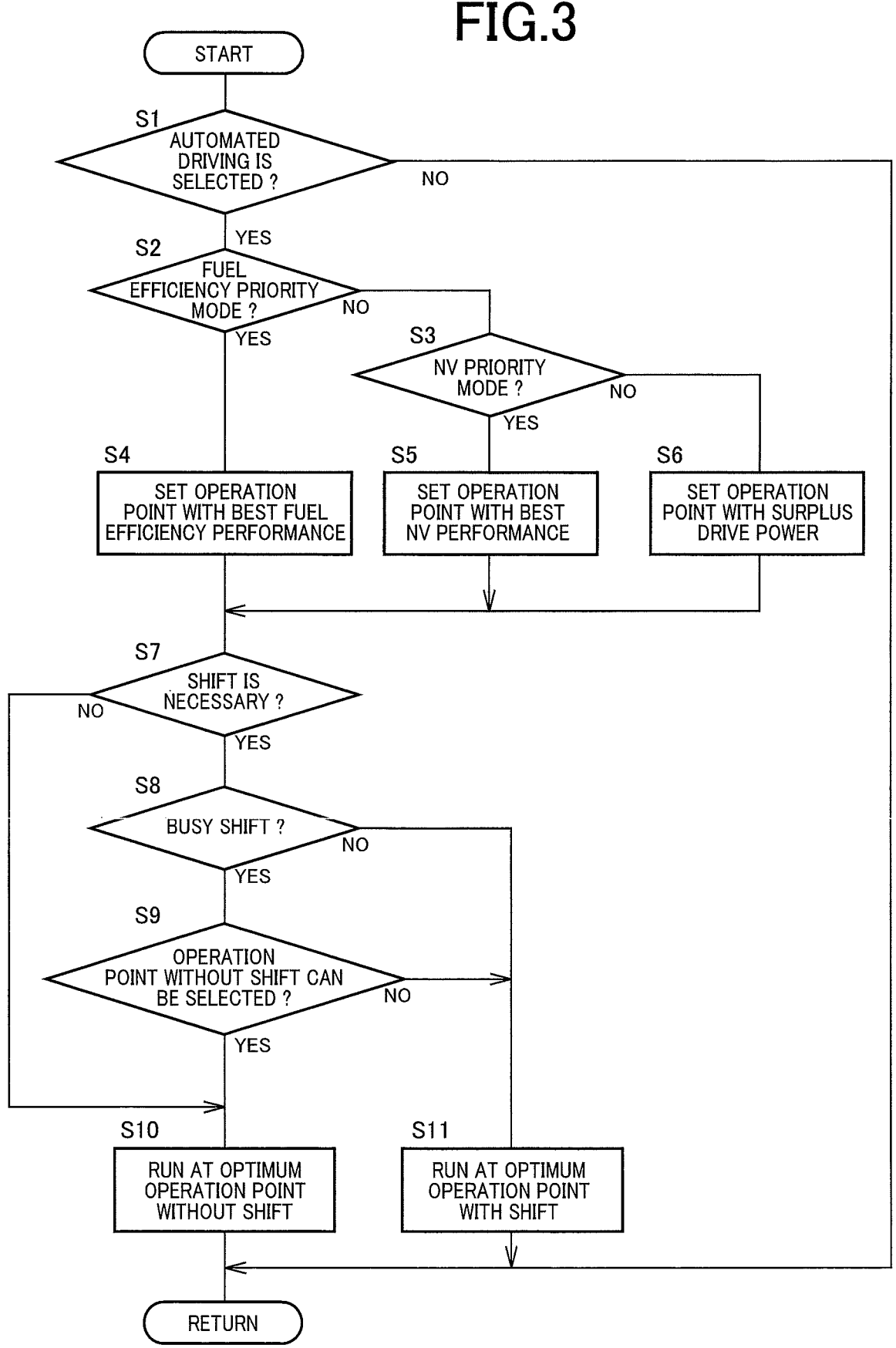
FIG. 3 is a flowchart for specifically explaining an operation of an automated-driving running control portion of FIG. 1.

At S1 of FIG. 3, it is determined whether automated driving is selected. Specifically, it is determined whether the auto-cruise running mode is selected by the auto-cruise setting switch 70, and if the auto-cruise running mode is not selected, the process is simply terminated. In this case, the operated running control portion 46 performs the operated running mode in which the vehicle 8 is accelerated/decelerated in accordance with the driver's acceleration/deceleration operation and, specifically, the engine torque Te is controlled in accordance with the accelerator operation amount Acc. When the operated running mode is performed, the shift control portion 42 provides the engagement/release control of the lockup clutch 32 in accordance with the lockup switching map having the intermediate-sized lockup region indicated by the dashed-dotted line in FIG. 8.

If the determination of S1 is YES (affirmative), i.e., if the auto-cruise running mode is selected, S2 and subsequent steps are executed. At S2, it is determined whether the fuel efficiency priority mode is selected by the priority mode setting switch 72, and if the fuel efficiency priority mode is selected, S4 is executed. If the fuel efficiency priority mode is not selected, S3 is executed after S2 to determine whether the NV priority mode is selected. If the NV priority mode is selected, S5 is executed, and if the NV priority mode is not selected, S6 is executed since the remaining drive power priority mode is selected. If it is determined from map information of a navigation system etc., road information provided from the outside, etc., or from a change in the engine torque Te, a status of shifting of the automatic transmission 12, etc., that the vehicle 8 is running with a large running load or with a significantly changing running load on a mountain road, a winding road, etc., the vehicle 8 may forcibly be shifted to the drive power priority mode even when the fuel efficiency priority mode or the NV priority mode is selected.

At S4 executed when the fuel efficiency priority mode is selected, an operation point, i.e., a combination between the engine torque Te and the forward gear position of the automatic transmission 12 (hereinafter referred to as a forward gear position Gs), with the best fuel efficiency performance is set. Specifically, a signal process is executed in accordance with the flowchart of FIG. 4. At S4-1 of FIG. 4, an instruction for applying the lockup switching map for the fuel efficiency priority mode, i.e., the lockup switching map with the widest lockup region indicated by the broken line in FIG. 8, is output to the shift control portion 42. At S4-2, the required drive power Fa is calculated based on an automated-driving condition, such as the target vehicle speed Vtag, the target inter-vehicle distance Dtag, and the target acceleration Gtag, etc., and at S4-3, in a range of an allowable drive power [(Fa−α) to (Fa+α)] acquired by adding/subtracting an allowable value α to/from the required drive power Fa, a plurality of candidate operation points (Te, Gs) is set as points at which the drive power can be achieved. For example, the allowable value a is defined as a value at a level not giving a discomfort feeling to the driver such as a value of about 5 to 15% of the required drive power Fa. For example, based on an upper limit value (Fa+α), a median value (Fa), a lower limit value (Fa−α), etc. within the range of the allowable drive power [(Fa−α) to (Fa+α)], the plurality of candidate operation points (Te, Gs) is extracted, including those in the cases of the different forward gear positions Gs. The automated-driving condition corresponds to a predefined target running state.

At S4-4, a fuel efficiency is calculated for each of the plurality of candidate operation points (Te, Gs) by using predefined data map, or arithmetic expression, etc. The data map and the arithmetic expression for calculating the fuel efficiency reflect the fuel efficiency varying depending on an engagement/release state of the lockup clutch 32 engaged/released in accordance with the lockup switching map of FIG. 8 by using the engine torque Te as a parameter, and the fuel efficiency (=running distance/fuel amount) becomes higher at an operation point (Te, Gs) at which the lockup clutch 32 is engaged. At S4-5, the candidate operation point (Te, Gs) with the best fuel efficiency is selected as a fuel efficiency optimum operation point. Since the fuel efficiency becomes higher at an operation point (Te, Gs) at which the lockup clutch 32 is engaged, if an operation point (Te, Gs) with the lockup clutch 32 engaged exists, the operation point (Te, Gs) with the lockup clutch 32 engaged is consequently highly likely to be selected as the fuel efficiency optimum operation point. Specifically, the required drive power Fa is provided with a margin of ±α during running so as to increase a frequency of running with the lockup clutch 32 engaged in accordance with the lockup switching map, so that the fuel efficiency performance can be improved by the engagement of the lockup clutch 32. Providing the required drive power Fa with a margin has the same meaning as providing the automated-driving condition such as the target vehicle speed Vtag and the target acceleration Gtag, i.e., the target running state, with a margin. When the forward gear position Gs is different, the engine torque Te may change in accordance with the speed change ratio γ thereof, so that the engagement/release state of the lockup clutch 32 may change, and therefore, at S4-3 described above, different candidates of the forward gear position Gs may be set within an available range not subject to the limitation due to excessive rotation etc., irrespective of the shift map of FIG. 7.

In FIG. 3, at S5 executed if the NV priority mode is selected, an operation point (Te, Gs) with the best NV performance is set. Specifically, a signal process is executed in accordance with the flowchart of FIG. 5. At S5-1 of FIG. 5, an instruction for applying the lockup switching map for the NV priority mode, i.e., the lockup switching map with the narrowest lockup region indicated by the dashed-two dotted line in FIG. 8, is output to the shift control portion 42. At S5-2, the required drive power Fa is calculated based on the automated-driving condition, i.e., the target vehicle speed Vtag, the target inter-vehicle distance Dtag, the target acceleration Gtag, etc., and at S5-3, in a range of an allowable drive power [(Fa−β) to (Fa+β)] acquired by adding/subtracting an allowable value β to/from the required drive power Fa, a plurality of candidate operation points (Te, Gs) is set as points at which the drive power can be achieved. For example, the allowable value β is a value at a level not giving a discomfort feeling to the driver such as a value of about 5 to 15% of the required drive power Fa and may be the same as the allowable value α. For example, based on an upper limit value (Fa+β), a median value (Fa), a lower limit value (Fa−β), etc. within the range of the allowable drive power [(Fa−β) to (Fa+β)], the plurality of candidate operation points (Te, Gs) is extracted, including those in the cases of the different forward gear positions Gs.

At S5-4, a booming noise evaluation score is calculated for each of the plurality of candidate operation points (Te, Gs) by using predefined data map, arithmetic expression, etc. The booming noise evaluation score is defined such that a larger booming noise and a poorer NV performance make the evaluation score higher. The data map and the arithmetic expression for calculating the booming noise evaluation score reflect the booming noise varying depending on the engagement/release state of the lockup clutch 32 engaged/released in accordance with the lockup switching map of FIG. 8 by using the engine torque Te as a parameter, and the booming noise evaluation score becomes higher at an operation point (Te, Gs) at which the lockup clutch 32 is engaged. At S5-5, a gear noise evaluation score is calculated for each of the plurality of candidate operation points (Te, Gs) by using predefined data map, arithmetic expression, etc. The gear noise evaluation score is defined such that a larger gear noise and a poorer NV performance make the evaluation score higher. The data map and the arithmetic expression for calculating the gear noise evaluation score reflect the gear noise varying depending on the engagement/release state of the lockup clutch 32 engaged/released in accordance with the lockup switching map of FIG. 8 by using the engine torque Te as a parameter, and the gear noise evaluation score becomes higher at an operation point (Te, Gs) at which the lockup clutch 32 is engaged. At S5-6, by adding etc. of the booming noise evaluation score and the gear noise evaluation score, the candidate operation point (Te, Gs) with the best NV performance having the smallest evaluation score is selected as an NV optimum operation point. Since the booming noise evaluation score and the gear noise evaluation score become lower at an operation point (Te, Gs) at which the lockup clutch 32 is released, if an operation point (Te, Gs) with the lockup clutch 32 released exists, the operation point (Te, Gs) with the lockup clutch 32 released is highly likely to be selected as the NV optimum operation point. When the forward gear position Gs is different, the engine torque Te may change in accordance with the speed change ratio γ thereof, so that the engagement/release state of the lockup clutch 32 may change, and therefore, at S5-3 described above, different candidates of the forward gear position Gs may be set within an available range not subject to the limitation due to excessive rotation etc., irrespective of the shift map of FIG. 7.

In FIG. 3, at S6 executed if the drive power priority mode is selected, an operation point (Te, Gs) with a surplus drive power is set. Specifically, a signal process is executed in accordance with the flowchart of FIG. 6. At S6-1 of FIG. 6, the required drive power Fa is calculated based on the automated-driving condition, i.e., the target vehicle speed Vtag, the target inter-vehicle distance Dtag, the target acceleration Gtag, etc., and at S6-2, a plurality of candidate operation points (Te, Gs) is set as points at which a surplus drive power (Fa+γ) acquired by adding an allowable value γ to the required drive power Fa can be achieved. The allowable value γ is, for example, a value of about 20 to 30% of the required drive power Fa and may be a fixed value or may have a predetermined margin. The plurality of candidate operation points (Te, Gs) is set by changing the forward gear position Gs within an available range not subject to the limitation due to excessive rotation etc., irrespective of the shift map of FIG. 7. At S6-3, the operation point (Te, Gs) of the forward gear position Us on the low speed side having the largest speed change ratio γ is set as a drive power surplus optimum operation point out of the plurality of candidate operation points (Te, Gs). In the drive force priority mode, the shift control portion 42 provides the engagement/release control of the lockup clutch 32 by using the normal lockup switching map having the lockup region indicated by the dashed-dotted line in FIG. 8.

Returning to FIG. 3, when the optimum operation point is set at S4, S5, or S6, S7 is executed to determine whether a shift of the automatic transmission 12 is necessary. Specifically, comparing the forward gear position Gs for the optimum operation point and the current gear position, if the current gear position is different from the forward gear position Gs, it is determined that the shift is necessary, and S8 and subsequent steps are executed; however, if the shift is unnecessary, S10 is immediately executed to perform running at the optimum operation point without performing the shift. At S8, it is determined whether the shift of the automatic transmission 12 is a busy shift. Specifically, it is determined whether an elapsed time from a previous shift of the automatic transmission 12 is equal to or less than a predefined determination value, and if the time is larger than the determination value, the shift is not a busy shift, so that the shift is performed to run at the optimum operation point at S11. In the case of a busy shift, S9 is executed to determine whether an operation point not accompanied by a shift can be selected. Specifically, it is determined whether an operation point (Te, Gs) without a shift exists among the plurality of candidate operation points (Te, Gs) set at S4, S5, or S6, and if an operation point (Te, Gs) without a shift exists, the operation point (Te, Gs) without a shift is defined as the optimum operation point, and S10 is executed. If an operation point (Te, Gs) without a shift does not exist, S11 is executed even if the shift is a busy shift, and the shift is performed to run at the optimum operation point.

A thick arrow of FIG. 8 is an example of a change in an operating point P (Te, Ne) of the engine 28 when the fuel efficiency priority mode is selected in the auto-cruise running that is automated driving. Specifically, the arrow indicates a change in the operating point P (Te, Ne) at the time of start from a vehicle stop state due to waiting for a traffic light etc. and accelerating to the target vehicle speed Vtag, and the operating point P starts from an operating point P1 at which the engine rotation speed Ne is an idling rotation speed Neidl and enters the lockup region at an operating point P2. When the operating point P enters the lockup region, the lockup clutch 32 is engaged so that a torque amplification action of the torque converter 30 cannot be acquired, and therefore, the engine torque Te must be raised to acquire the required drive power Fa, which may cause the operating point P to deviate from the lockup region. However, in this example, since the operation point (Te, Gs) with a favorable fuel efficiency performance is selected for running within the range of the allowable drive power [(Fa−α) to (Fa+α)], the operating point P is consequently maintained within the lockup region so that the lockup clutch 32 is consequently engaged as indicated by the operating points P2 to P3, and the fuel efficiency performance is improved.

The operating point P3 is an operating point at which the vehicle speed V has reached the target vehicle speed Vtag.

Figure 9:
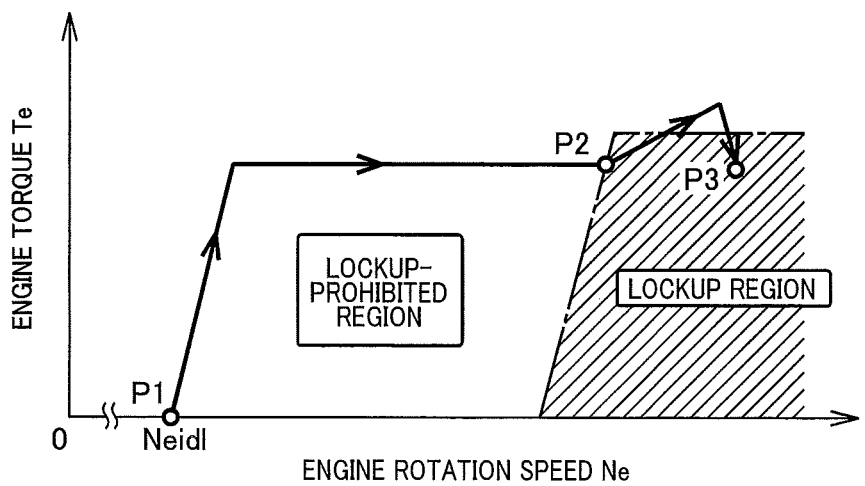
FIG. 9 is a diagram for explaining an example of a change in engine operating point during running in an operated running mode for running in accordance with a driver's acceleration/deceleration operation in association with a lockup region of a lockup clutch.

On the other hand, in the operated running mode in which the vehicle 8 is accelerated/decelerated in accordance with the driver's acceleration/deceleration operation, the operating point P (Te, Ne) changes as shown in FIG. 9, for example. In this case, the operating point P also starts from the operating point P1 in the idling state and enters the lockup region at the operating point P2. Subsequently, when the engine torque Te becomes higher since the driver further depresses the accelerator pedal, the operating point P (Te, Ne) deviates from the lockup region, and the lockup clutch 32 is released. When the vehicle speed V comes close to the target vehicle speed Vtag and a returning operation of the accelerator pedal is performed, the operating point P enters the lockup region again so that the lockup clutch 32 is engaged, and the operating point P reaches the operating point P3. When the operating point P deviates from the lockup region in this way, the fuel efficiency performance may deteriorate, and a feeling of a busy shift may be caused by the engagement/release of the lockup clutch 32. In FIGS. 8 and 9, a change in the operating point P due to a shift of the automatic transmission 12 is not taken into consideration.

As described above, according to the electronic control device 40 of the vehicle 8 of this example, if the fuel efficiency priority mode is selected during the auto-cruise running that is the automated driving, the target vehicle speed Vtag or the target acceleration Gtag are set as the target running state such that the lockup clutch 32 is brought into the engaged state in accordance with the lockup switching map. Specifically, the required drive power Fa for running at the target vehicle speed Vtag or the target acceleration Gtag is provided with a margin of ±α during running so that the lockup clutch 32 is engaged in accordance with the lockup switching map. This increases a frequency of running with the lockup clutch 32 engaged in accordance with the lockup switching map, and the fuel efficiency performance can be improved without impairing the NV performance as in the case of expanding the lockup region. In the auto-cruise running not based on the driver's acceleration/deceleration operation, even if the required drive power Fa is somewhat changed, occupants such as the driver are not likely to have a discomfort feeling, and therefore, the fuel efficiency performance can be improved without impairing the NV performance while preventing the occupants from having a discomfort feeling.

While the lockup switching map of FIG. 8 is defined by using the engine torque Te as a parameter, the required drive power Fa is calculated so that the vehicle 8 can run with the automated-driving condition such as the target vehicle speed Vtag and the target acceleration Gtag, and a plurality of different candidate operation points (Te, Gs) of the engine torque Te is set within a range in which the allowable drive power [(Fa−α) to (Fa+α)] defined to include the required drive power Fa is acquired, so as to select from the plurality of candidates the fuel efficiency optimum operation point with the best fuel efficiency performance in consideration of the engagement/release state of the lockup clutch 32, and this consequently increases a frequency of running with the lockup clutch 32 engaged, so that the fuel efficiency performance is improved.

The vehicle 8 includes the automatic transmission 12 establishing any one of the plurality of forward gear positions 1st to 6th, and a plurality of different candidate operation points (Te, Gs) of the engine torque Te is set, including those in the cases of the different forward gear positions Gs, within a range in which the allowable drive power [(Fa−α) to (Fa+α)] is acquired, so as to select from the plurality of candidates the candidate with the best fuel efficiency performance, and this further increases a frequency of running with the lockup clutch 32 engaged while the forward gear position Gs is changed, so that the fuel efficiency performance can further be improved.

In the lockup switching map used in the shift control portion 42 when the fuel efficiency priority mode is selected, as indicated by the broken line in FIG. 8, the lockup region is expanded into a spike shape or a chevron shape to a region of the high engine torque Te in a certain engine rotation speed region in which the NV performance is favorable, as compared to the normal lockup switching map used in the operated running mode indicated by the dashed-dotted line, and this further increases a frequency of running with the lockup clutch 32 engaged while suppressing a busy shift of the lockup clutch 32, so that the fuel efficiency performance can further be improved. Specifically, if the lockup switching map having the lockup region expanded in the certain engine rotation speed region as in the fuel efficiency priority mode is used during running in the operated running mode, and the engine rotation speed Ne increases while the engine torque Te is substantially constant during acceleration etc., a busy shift occurs so that the lockup clutch 32 is engaged and released in a short time when the engine rotation speed Ne passes through the certain engine rotation speed region, which may cause the driver to have a discomfort feeling. Therefore, the normal lockup switching map (the map of the dashed-dotted line of FIG. 8) without such an expanded region is used in the operated running mode. On the other hand, since the engine torque Te is controlled to be maintained within the lockup region as much as possible during running in the fuel efficiency priority mode in which the required drive power Fa is provided with a margin so as to increase a frequency of running with the lockup clutch 32 engaged, the lockup region can be expanded to further improve the fuel efficiency performance while suppressing the busy shift of the lockup clutch 32.

At the time of start of the vehicle 8 from the stop state, the required drive power Fa corresponding to the target acceleration Gtag is set such that the lockup clutch 32 is maintained in the engaged state in accordance with the lockup switching map at the time of acceleration with the target acceleration Gtag defined in advance as the target running state. Specifically, the required drive power Fa is calculated so that the vehicle 8 is accelerated with the target acceleration Gtag defined in advance as the target running state, and the required drive power Fa is provided with a margin of ±α during accelerated running so as to increase a frequency of running with the lockup clutch 32 engaged in accordance with the lockup switching map, which increases a frequency of accelerated running with the lockup clutch 32 engaged, so that the fuel efficiency performance is improved. The acceleration G of the vehicle 8 fluctuates so as to maintain the lockup clutch 32 in the engaged state; however, since this is not acceleration due to the driver's driving operation, the occupants such as the driver are not likely to have a discomfort feeling, so that the fuel efficiency performance can be improved while preventing the occupants from having a discomfort feeling.

If the NV priority mode is selected in the auto-cruise running that is the automated driving, the required drive power Fa is calculated so that the vehicle 8 can run with the automated-driving condition such as the target vehicle speed Vtag and the target acceleration Gtag, and a plurality of different candidate operation points (Te, Gs) of the engine torque Te is set, including those in the cases of the different forward gear positions Gs, within a range in which the allowable drive power [(Fa−β) to (Fa+β)] defined to include the required drive power Fa is acquired, so as to select from the plurality of candidates the candidate most excellent in NV performance in terms of noise and vibration as the NV optimum operation point for running, so that the excellent NV performance can be acquired. In the auto-cruise running not based on the driver's acceleration/deceleration operation, even if the required drive power Fa is somewhat changed, the occupants such as the driver are not likely to have a discomfort feeling, so that the NV performance can be improved while preventing the occupants from having a discomfort feeling.

In the NV priority mode, as indicated by the dashed-two dotted line of FIG. 8, the lockup clutch 32 is subjected to the engagement/release control in accordance with the lockup switching map in which the lockup region is limited to the side of the low engine torque Te, i.e., to the region advantageous for the NV performance, as compared to the normal lockup switching map indicated by the dashed-dotted line, so that the more excellent NV performance is acquired.

If the drive power priority mode is selected in the auto-cruise running that is the automated driving, the required drive power Fa is calculated so that the vehicle 8 can run with the automated-driving condition such as the target vehicle speed Vtag and the target acceleration Gtag, and a plurality of different candidate operation points (Te, Gs) of the forward gear positions Gs and the engine torque Te is set such that the surplus drive power (Fa+γ) larger than the required drive power Fa is acquired, so as to select from the plurality of candidates the operation point (Te, Gs) of the forward gear position Gs on the low speed side having the largest speed change ratio γ as the drive power surplus optimum operation point for running, and this makes a degree of surplus of the drive power higher, so that the auto-cruise running can be performed with a surplus drive power while suppressing the busy shift of the forward gear position Gs on an uphill road, a winding road, etc.

Although the example of the present invention has been described in detail with reference to the drawings, this is merely an embodiment, and the present invention can be implemented in variously modified and improved forms based on the knowledge of those skilled in the art.

Figure 10:
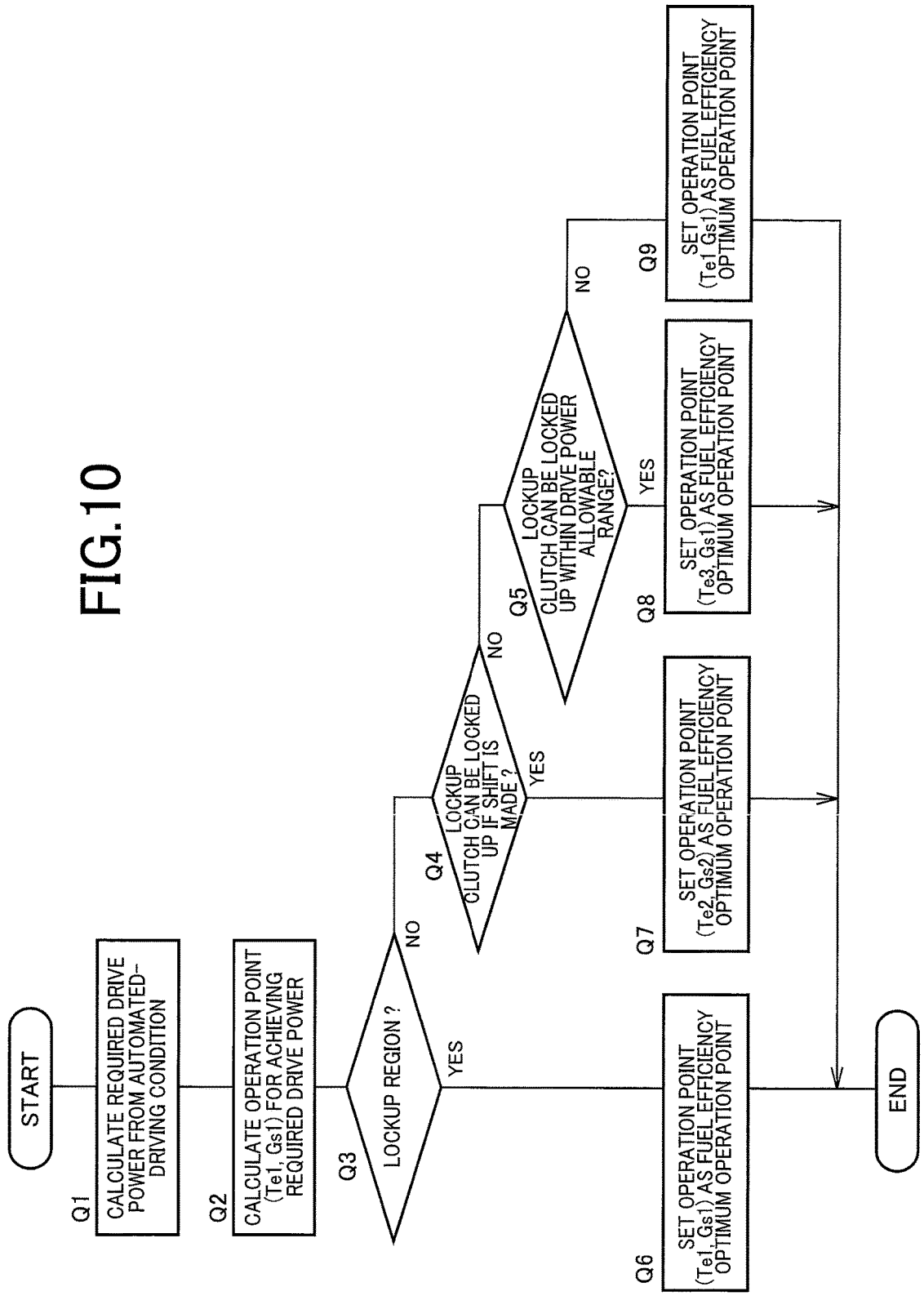
FIG. 10 is a flowchart for explaining another example of the processing contents of step S4 of FIG. 3.

FIG. 10 is a flowchart used instead of FIG. 4 when an operation point with favorable fuel efficiency is set at S4 of FIG. 3. At Q1 of FIG. 10, the required drive power Fa is calculated based on the automated-driving condition, i.e., the target vehicle speed Vtag, the target inter-vehicle distance Dtag, the target acceleration Gtag, etc., and an operation point (Te1, Gs1) is calculated at Q2 so that the required drive power Fa can be achieved. At Q3, it is determined whether an engine torque Te1 of the operation point (Te1, Gs1) is within the lockup region, and if the engine torque Te1 is within the lockup region, Q6 is executed to set the operation point (Te1, Gs1) as the fuel efficiency optimum operation point. As a result, the auto-cruise running is performed with the lockup clutch 32 engaged.

If the determination of Q3 is NO (negative), i.e., if the engine torque Te1 of the operation point (Te1, Gs1) is in a lockup-prohibited region, Q4 is executed to determine whether the lockup clutch 32 can be locked up if a shift is made. Specifically, it is determined whether the lockup clutch 32 can be locked up through a change in the engine torque Te associated with the shift within a shift available range not subject to the limitation due to excessive rotation etc., irrespective of the shift map of FIG. 7. If it is determined that the lockup clutch 32 can be locked up after a shift, Q7 is executed to set an operation point (Te2, Gs2) corresponding to an operation point after performing the shift as the fuel efficiency optimum operation point. As a result, the auto-cruise running is performed with the lockup clutch 32 engaged.

If the determination of Q4 is NO (negative), i.e., if the shift is unavailable or the lockup is not enabled through any shift, Q5 is executed to determine whether the lockup clutch 32 can be locked up within an allowable range of change in the drive power. For example, based on an engine rotation speed Ne1 obtained from the gear ratio γ of the forward gear position Gs1 at the operation point (Te1, Gs1) and the vehicle speed V, an upper limit Te3 of the engine torque Te enabling the lockup is calculated from the lockup switching map indicated by the broken line of FIG. 8 to determine whether a difference between the upper limit Te3 and the engine torque Te1 of the operation point (Te1, Gs1) is within an allowable range. For example, the allowable range is defined as a predetermined range such as 5 to 15% of the engine torque Te1. If the difference between the upper limit Te3 and the engine torque Te1 is within the allowable range, the change in the drive power is not likely to give a discomfort feeling to occupants, and therefore, Q8 is executed to set an operation point (Te3, Gs1) as the fuel efficiency optimum operation point at which the engine torque Te is limited to the upper limit Te3. As a result, although the drive power somewhat changes, the auto-cruise running is performed with the lockup clutch 32 engaged. On the other hand, if the difference between the upper limit Te3 and the engine torque Te1 exceeds the allowable range, Q9 is executed after Q5 to set the operation point (Te1, Gs1) in which the lockup clutch 32 is not in the lockup region to the fuel efficiency optimum operation point. Q5 may include searching for an operation point (Te3, Gs3) at which the lockup clutch 32 can be locked up in association with a shift within an allowable range of change in the drive power irrespective of the forward gear position Gs1.

Even in this example, if the lockup clutch 32 can be engaged in accordance with the lockup switching map within the range of the engine torque Te in which the drive power within a predetermined allowable range can be acquired with respect to the required drive power Fa, Q8 is executed to set the operation point (Te3, Gs1) at which the lockup clutch 32 can be locked up as the fuel efficiency operation point, so that the auto-cruise running is performed with the lockup clutch 32 engaged. This increases the frequency of running of the vehicle 8 with the lockup clutch 32 engaged without impairing the NV performance as in the case of expanding the lockup region, so that the fuel efficiency performance is improved.

In this example, if the lockup clutch 32 can be locked up through a change in the engine torque Te in association with a shift within the shift available range not subject to the limitation due to excessive rotation etc., irrespective of the shift map of FIG. 7, Q7 is executed to set the operation point (Te2, Gs2) corresponding to an operation point after performing the shift as the fuel efficiency optimum operation point, so that the auto-cruise running is performed with the lockup clutch 32 engaged. This further increases the frequency of running of the vehicle 8 with the lockup clutch 32 engaged, which further improves the fuel efficiency performance.

Although the examples of the present invention have been described in detail with reference to the drawings, these are merely an embodiment, and the present invention can be implemented in variously modified and improved forms based on the knowledge of those skilled in the art.

REFERENCE SIGNS LIST

8: vehicle 12: automatic transmission 28: engine 30: torque converter (fluid transmission device) 32: lockup clutch 40: electronic control device (control device) 42: shift control portion (lockup control portion) 44: automated-driving running control portion 46: operated running control portion 52: fuel efficiency priority running portion 54: NV priority running portion 56: drive power priority running portion Te: engine torque

What is claimed is:

1. A control device of a vehicle disposed on the vehicle including an engine and a fluid transmission device including a lockup clutch, the control device of the vehicle comprising:
   an automated-driving running control portion automatically controlling at least an engine torque so that the vehicle runs in a predefined target running state without requiring an acceleration/deceleration operation; and
   a lockup control portion engaging/releasing the lockup clutch in accordance with a predefined lockup condition, wherein
       the automated-driving running control portion includes a fuel efficiency priority running portion setting the target running state such that the lockup clutch is brought into an engaged state in accordance with the lockup condition,
       the control device includes an operated running control portion controlling the engine torque in accordance with a driver's acceleration/deceleration operation,
       the lockup condition is defined based on a parameter related to the engine torque and an engine rotation speed, and
       the lockup condition is different between during running according to the operated running control portion and during running according to the fuel efficiency priority running portion, and wherein the lockup condition during running according to the fuel efficiency priority running portion has a lockup region for engaging the lockup clutch expanded to a region of the higher engine torque in a certain engine rotation speed region as compared to the lockup condition during running according to the operated running control portion.

2. The control device of the vehicle according to claim 1, wherein
   the fuel efficiency priority running portion calculates a required drive power with which the vehicle runs in the target running state and performs running with the engine torque at which the lockup clutch is engaged when the lockup clutch is engaged in accordance with the lockup condition within a range of the engine torque in which an allowable drive power defined to include the required drive power is acquired.

3. The control device of the vehicle according to claim 2, wherein
   the fuel efficiency priority running portion sets the target running state so that the engaged state of the lockup clutch is maintained in accordance with the lockup condition at a time of accelerating based on the target running state.

4. The control device of the vehicle according to claim 1, wherein
   the fuel efficiency priority running portion sets the target running state so that the engaged state of the lockup clutch is maintained in accordance with the lockup condition at a time of accelerating based on the target running state.

5. The control device of the vehicle according to claim 1, wherein
   the fuel efficiency priority running portion calculates a required drive power with which the vehicle runs in the target running state, prepares a plurality of different candidates of the engine torque within a range in which an allowable drive power defined to include the required drive power is acquired, and selects from the plurality of candidates a candidate with a best fuel efficiency performance in consideration of an engagement/release state of the lockup clutch engaged/released in accordance with the engine torque.

6. The control device of the vehicle according to claim 5, wherein
   the vehicle includes an automatic transmission establishing a plurality of forward gear positions different in gear ratio, and wherein
   the fuel efficiency priority running portion sets the plurality of different candidates of the engine torque in consideration with the different forward gear positions within the range in which the allowable drive power is acquired, and selects from the plurality of candidates the candidate with the best fuel efficiency performance.

7. The control device of the vehicle according to claim 6, wherein
   the automated-driving control portion includes a noise-vibration (NV) priority running portion calculating a required drive power with which the vehicle runs in the target running state, preparing a plurality of different candidates of the engine torque in consideration with the different forward gear positions within a range in which an allowable drive power defined to include the required drive power is acquired, and selecting from the plurality of candidates a candidate most excellent in NV performance in terms of noise and vibration.

8. The control device of the vehicle according to claim 7, wherein
   the automated-driving control portion includes a drive power priority running portion calculating a required drive power with which the vehicle runs in the target running state, preparing a plurality of different candidates of the forward gear position and the engine torque such that a surplus drive power larger than the required drive power is acquired, and selecting from the plurality of candidates a candidate of the forward gear position on the low speed side having the largest speed change ratio.

9. The control device of the vehicle according to claim 6, wherein
   the automated-driving control portion includes a drive power priority running portion calculating a required drive power with which the vehicle runs in the target running state, preparing a plurality of different candidates of the forward gear position and the engine torque such that a surplus drive power larger than the required drive power is acquired, and selecting from the plurality of candidates a candidate of the forward gear position on the low speed side having the largest speed change ratio.

10. A control device of a vehicle disposed on the vehicle including an engine and a fluid transmission device including a lockup clutch, the control device of the vehicle comprising:
- an automated-driving running control portion automatically controlling at least an engine torque so that the vehicle runs in a predefined target running state without requiring an acceleration/deceleration operation; and
- a lockup control portion engaging/releasing the lockup clutch in accordance with a predefined lockup condition, wherein
    - the automated-driving running control portion includes a fuel efficiency priority running portion setting the target running state such that the lockup clutch is brought into an engaged state in accordance with the lockup condition,
    - the lockup condition is defined based on at least a parameter related to the engine torque,
    - the fuel efficiency priority running portion calculates a required drive power with which the vehicle runs in the target running state and performs running with the engine torque at which the lockup clutch is engaged when the lockup clutch is engaged in accordance with the lockup condition within a range of the engine torque in which an allowable drive power defined to include the required drive power is acquired, and
    - the fuel efficiency priority running portion sets the target running state so that the engaged state of the lockup clutch is maintained in accordance with the lockup condition at a time of accelerating based on the target running state.

11. A control device of a vehicle disposed on the vehicle including an engine and a fluid transmission device including a lockup clutch, the control device of the vehicle comprising:
- an automated-driving running control portion automatically controlling at least an engine torque so that the vehicle runs in a predefined target running state without requiring an acceleration/deceleration operation; and
- a lockup control portion engaging/releasing the lockup clutch in accordance with a predefined lockup condition, wherein
    - the automated-driving running control portion includes a fuel efficiency priority running portion setting the target running state such that the lockup clutch is brought into an engaged state in accordance with the lockup condition,
    - the lockup condition is defined to include a parameter related to the engine torque,
    - the fuel efficiency priority running portion calculates a required drive power with which the vehicle runs in the target running state, prepares a plurality of different candidates of the engine torque within a range in which an allowable drive power defined to include the required drive power is acquired, and selects from the plurality of candidates a candidate with a best fuel efficiency performance in consideration of an engagement/release state of the lockup clutch engaged/released in accordance with the engine torque,
    - the vehicle includes an automatic transmission establishing a plurality of forward gear positions different in gear ratio,
    - the fuel efficiency priority running portion sets the plurality of different candidates of the engine torque in consideration with the different forward gear positions within the range in which the allowable drive power is acquired, and selects from the plurality of candidates the candidate with the best fuel efficiency performance, and
    - the automated-driving control portion includes a noise-vibration (NV) priority running portion calculating a required drive power with which the vehicle runs in the target running state, preparing a plurality of different candidates of the engine torque in consideration with the different forward gear positions within a range in which an allowable drive power defined to include the required drive power is acquired, and selecting from the plurality of candidates a candidate most excellent in NV performance in terms of noise and vibration.

12. The control device of the vehicle according to claim 11, wherein
the automated-driving control portion includes a drive power priority running portion calculating a required drive power with which the vehicle runs in the target running state, preparing a plurality of different candidates of the forward gear position and the engine torque such that a surplus drive power larger than the required drive power is acquired, and selecting from the plurality of candidates a candidate of the forward gear position on the low speed side having the largest speed change ratio.

\* \* \* \* \*